Figure 1:
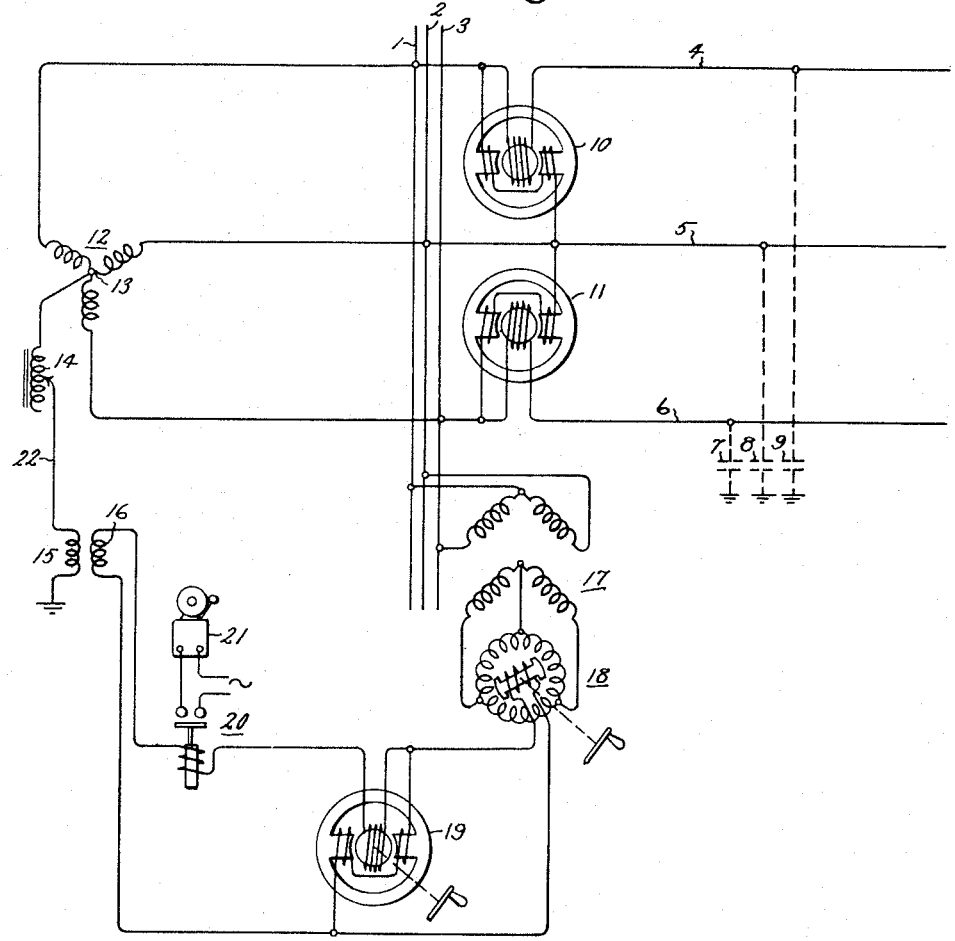

Sept. 19, 1950  N. E. DILLOW  2,523,002
GROUND FAULT NEUTRALIZER SYSTEM
Filed Nov. 30, 1949  3 Sheets-Sheet 1

Inventor
Noel E. Dillow,
by Ernest H. Britton
His Attorney.

Sept. 19, 1950  N. E. DILLOW  2,523,002
GROUND FAULT NEUTRALIZER SYSTEM
Filed Nov. 30, 1949  3 Sheets—Sheet 2

Inventor:
Noel E. Dillow,
by Ernest C. Britton
His Attorney.

Patented Sept. 19, 1950

2,523,002

UNITED STATES PATENT OFFICE 2,523,002

GROUND FAULT NEUTRALIZER SYSTEM

Noel E. Dillow, Schenectady, N. Y., assignor to General Electric Company, a corporation of New York Application November 30, 1949, Serial No. 130,260

4 Claims. (Cl. 171—97)

My invention relates to improvements in protective apparatus for multiple phase alternating current electric systems such as those of the type which employ, between a neutral point of the system and ground, a connection which has an inductive reactance equal to the zero phase sequence impedance of the system and operative on the occurrence of a ground fault on one conductor of the system to suppress the capacitive current to ground at the grounded point.

In United States Letters Patent 1,537,371, issued May 12, 1925, to Waldemar Petersen and assigned to the same assignee as this application, there is disclosed an arrangement for suppressing faults to ground of a transient or arcing character by connecting in the system a grounding impedance or impedances whose inductive reactance is equal in magnitude to the zero phase sequence capacitive reactance of the system. Such impedances are known as ground fault neutralizers since their function is to neutralize the unbalanced capacitive or leading current to ground of the system on the occurrence of a fault to ground by a substantially equal inductive or lagging current thereby to suppress ground faults of a transient character. Suppression of these capacitive transient faults will often avoid unnecessary operation of the selectively timed automatic circuit breakers and control relays protecting the various parts of the system against similar faults of a more permanent nature.

In a preferred form of ground fault neutralizer system, only one ground fault neutralizer inductance is employed. If, in such a system, the line to ground capacitances are not equal for each of the three lines in a three phase system due to lack of periodically spaced transpositions of the conductors or other physical variations in the system, or if an apparent capacitance unbalance exists due to the connection of voltage regulators in an open delta configuration on the system, then the zero phase sequence capacitive reactance of the system will be different depending upon which line in the three phase system is grounded. This condition may be hereinafter referred to as an unsymmetrical conductor capacitance distribution. The inductive reactance of the single ground fault neutralizer will, therefore, not accurately match the zero phase sequence capacitive reactance of the system for a fault on any one of the three lines. The anticipated action of the ground fault neutralizer in suppressing faults to ground is not then practically realized.

It is, therefore, an object of my invention to provide an apparatus for assuring proper ground fault neutralizer operation in systems using only one neutralizer reactance where the capacitances of the system are unsymmetrical.

My invention, therefore, consists generally in an apparatus for applying an alternating current voltage or voltages of proper magnitude and phase to establish an effective capacitance balance of the system as seen at the ground fault neutralizer.

Figure 2:
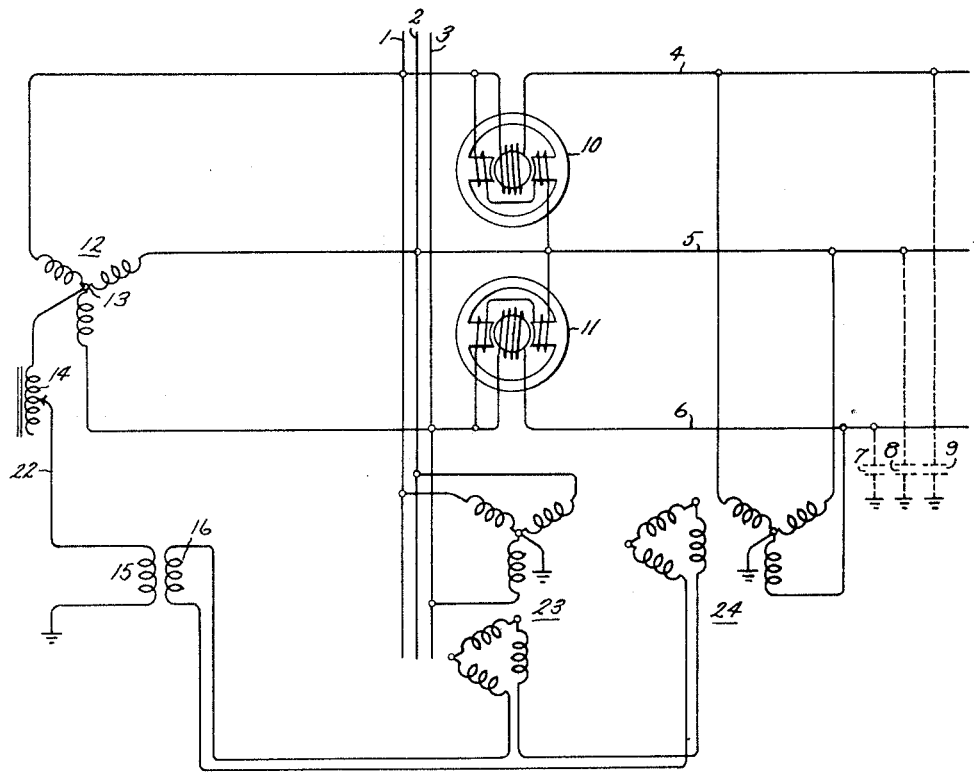
Figure 3:
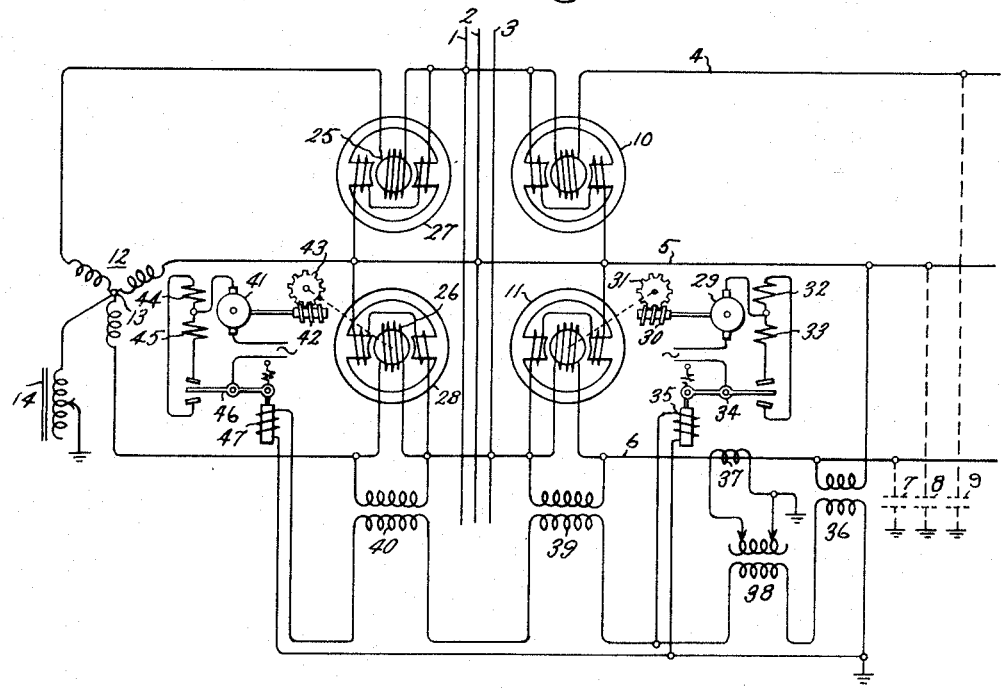

In the drawing, Fig. 1 shows a ground fault neutralizer system including an apparatus for introducing a correction voltage which is manually adjustable in phase and magnitude; Fig. 2 shows such a system including an apparatus for automatically providing a voltage correction signal. Fig. 3 shows an apparatus for automatically providing two voltage correction signals. My invention will be better understood from the following description when considered in connection with the accompanying drawings and its scope will be pointed out in the appended claims.

Referring more particularly to Fig. 1, there are shown input power conductors 1, 2, and 3 and transmission line conductors 4, 5, and 6 with line to ground capacitances respectively represented as 7, 8, and 9. Line to ground capacitances 7, 8, and 9 may or may not be equal in magnitude. Between the power input conductors 1, 2, and 3 and the transmission line conductors 4, 5, and 6, there are two open delta connected voltage regulators 10 and 11 which may be arranged to maintain the voltage on transmission line conductors 4, 5, and 6, within a predetermined desired range independent of load through the use of auxiliary voltage regulator positioning apparatus such as that schematically shown in Fig. 3 and described below in connection with that figure. Voltage regulators 10 and 11 appear as capacitances in the system of a value dependent upon the magnitude of voltage correction supplied. Therefore, since the voltage regulators are connected in open delta, that is, between two respective pairs of lines, their presence creates an apparent unbalance in the line to ground capacitances of the system.

To the input power lines 1, 2, and 3, there is also connected a grounding transformer 12 having three windings which are wye connected to a neutral point 13. Between neutral point 13 and ground there is connected a ground fault neutralizer reactor 14 which preferably has coil taps for stepped adjustment of the reactance value. Transformer 12 and neutralizer reactor 14 may be hereinafter referred to as comprising a ground fault neutralizer apparatus. It will be obvious that the system to be described below may also be employed with other known ground fault neutralizer apparatus configurations (not shown). Between ground fault neutralizer 14 and ground, there is connected the secondary winding of an auxiliary transformer 15. A system-capacity unbalance correction voltage is applied across the primary 16 of this auxiliary transformer 15. Transformer 15 preferably has a low magnetizing reactance and a high leakage reactance.

Transformer 15 is energized through circuits comprising the following elements; an open delta transformer 17 which is connected to incoming power lines 1, 2, and 3 supplies power to a manually adjustable phase shifting inductive device 18 which supplies power to a manually adjustable voltage regulator 19. The output of voltage regulator 19 is applied to primary winding 16 of auxiliary transformer 15. An overcurrent relay 20 is connected between regulator 19 and transformer primary 16. This relay energizes an alarm 21 for a purpose and under conditions which will be more particularly described below.

For practical operation of the ground fault neutralizer 14, the line to ground and line to neutral capacitances of the transmission lines comprised of conductors 4, 5, and 6 should all be balanced as viewed from the grounded end of the ground fault neutralizer 14, which will be designated 22. Any variations in the apparent line to ground capacitances such as those which may be caused by voltage regulators 10 and 11, or variations in the line to ground capacities 7, 8, and 9 will result in an unsymmetrical line to ground capacity pattern as seen at point 22. If the line to ground or line to neutral capacities are unequal, in the resulting unsymmetrical voltage pattern, when the voltages are represented vectorially, point 22 will not be at the geometrical center of the pattern. Accordingly, an alternating current voltage is derived from transformer 17 and manually adjusted in phase by device 18 and manually adjusted in magnitude by voltage regulator 19 and impressed upon transformer 15 so as to position the potential of point 22 in the geometrical center of the transmission line voltages as vectorially represented. When this correction has thus been made, the ground fault neutralizer 14 will function properly no matter which of the three conductors 4, 5, or 6 of the transmission line may become transiently grounded.

Where the line to ground capacitances 7, 8, and 9 are unequal due to conditions which are of a relatively fixed nature, such as variations in the physical configurations of the associated line conductors with respect to ground, phase adjusting device 18 and voltage regulator 19 will generally not require any manual adjustment for relatively long periods of time. However, if the capacitance unbalance is due to apparatus such as voltage regulators 10 and 11, changes in the load on the system may cause the line voltages to fluctuate and thereby cause operation of voltage regulators 10 and 11. The resulting changes in the apparent capacitances across the associated conductors may be rather frequent. Accordingly, it is desirable to have some means of notifying the operator that a change is required in the adjustment of device 18 and voltage regulator 19 to thereby adjust the balancing voltage.

When ground fault neutralizer 14 is properly adjusted, a maximum circulating current will exist in the neutralizer. This means that a maximum current will exist in the secondary winding of auxiliary transformer 15. This ground fault neutralizer circulating current is due to the line to ground capacitances of the transmission lines 4, 5, and 6, and since auxiliary transformer 15 is inserting a correction voltage to correct for any inequalities in these capacitances, the auxiliary transformer 15 is primarily opposing a component of this circulating current. When, through changes in the capacitances of the system, the ground fault neutralizer correction voltage adjustment is spoiled, the neutralizer circulating current will decrease and the voltage which opposes the output voltage of auxiliary transformer 15 will thereby decrease. The current in the primary winding 16 of auxiliary transformer 15 will therefore increase. This increase in current will be recognized by over-current relay 20, thus closing the relay contacts and energizing alarm 21. The operator is thus notified that further manual adjustments of phase adjustment device 18 and voltage regulator 19 is required in order to re-establish the capacitance balance for the system.

In Fig. 2, there is shown a modification of my invention wherein apparent line to ground capacitance unbalance such as that caused by the presence of voltage regulators 10 and 11, or an actual capacitance unbalance due to presence of other elements, is automatically compensated for through the auxiliary transformer 15. The signal for energizing transformer 15 in the proper phase and magnitude is derived from two 3-phase transformers 23 and 24, the primaries of which are connected in wye and the secondaries of which are connected in a "broken" delta, that is, the delta loops of these transformers, and the primary winding 16 of auxiliary transformer 15 are all connected in series. A comparison of the line to line voltages on the two sides of voltage regulators 10 and 11 is thereby made by transformers 23 and 24. Any difference in these voltages caused by capacitance unbalance derived from the presence of voltage regulators 10 and 11 is impressed across primary winding 16 of auxiliary transformer 15 to cause a voltage correction of the proper phase and magnitude between the ground fault neutralizer 14 and ground. This apparatus does not correct for differences in the line to ground capacitances 7, 8, and 9, except as effected by line to line unbalance.

In Fig. 3 there is shown a further modification of my invention wherein two system capacitance balancing voltages are applied between the system input conductors and the grounding transformer 12. These correction voltages are supplied respectively between conductor 1 and grounding transformer 12 and conductor 3 and grounding transformer 12 by secondary windings 25 and 26 of voltage regulators 27 and 28. Voltage regulators 27 and 28 may also be referred to as auxiliary transformers. Voltage regulator 11 may be equipped with an adjusting motor 29 which may be coupled to the regulator as shown schematically by worm 30 and pinion 31. Motor 29 may be of the reversible type, its direction of rotation being controlled by windings 32 and 33 which may be respectively energized, depending upon the direction of change of voltage correction required, by a voltage-sensitive relay 34 having an excitation winding 35. Winding 35 is energized from potential transformer 36 and current transformer 37 which is coupled to the excitation circuit through an isolating and adjusting transformer 38. The amount of voltage correction supplied by voltage regulator 11 is measured by an auxiliary transformer 39 which is connected across the secondary winding. A similar voltage measuring transformer 40 is connected across secondary 26 of voltage regulator 28.

Regulator 28 is also equipped with an adjusting motor 41. The drive coupling to the regulator includes a worm 42 and a pinion 43, and motor reversing fields 44 and 45 are provided which are energized by a voltage-sensitive relay 46 having a coil 47. Voltage relay coil 47, voltage relay coil 35, and the secondary windings of auxiliary transformers 39 and 40 are all in series. The secondary windings of transformers 39 and 40 are connected differentially to oppose one another. Therefore, when regulators 11 and 28 are producing exactly the same output correction voltage, the voltages of these windings cancel one another and relay winding 47, for regulator 28 has exactly the same potential as relay winding 35 for regulator 11. Therefore, if a voltage regulator correction signal is transmitted to relay winding 35 to change the adjustment of regulator 11, the same voltage signal also is applied to relay winding 47, thus changing the positions of adjustment of regulators 11 and 28 in like amounts. If there is any difference in the ultimate position of these two regulators, then the difference in the voltage output is measured by transformers 39 and 40 and an additional correction signal is applied to winding 47 of relay 46 to further adjust regulator 28 until the output as measured by transformer 40 matches the output of regulator 11 as measured by transformer 39. Corresponding control apparatus (not shown) is used for regulators 10 and 27.

It will, therefore, be seen from the above, that in the embodiment of this invention shown in Fig. 3, voltage regulators 27 and 28 are automatically controlled to insert a voltage signal into the grounding transformer and ground fault neutralizer system which is equal to the respective voltage signals provided by voltage regulators 10 and 11 for the transmission line system. The grounding transformer and ground fault neutralizer system is thereby matched to the transmission line system so that unbalances in the capacitances of the transmission line which are caused by voltage regulators 10 and 11 are ineffective to cause a mismatch between the ground fault neutralizer and the line to ground capacitances of the transmission line system to disable the ground fault neutralizer.

It will, of course, be understood that voltage regulators 27 and 28 could be manually adjustable to supply the proper voltage correction signals very much as voltage regulator 19 in Fig. 1 is manually adjustable for this purpose; however, no phase adjustment would be necessary as supplied by device 18 in Fig. 1.

It will be seen from the above description that this invention makes possible the use of the economical ground fault neutralizer system for protection against transient faults on an alternating current transmission line even though the line to ground capacitances of the line may be unbalanced, either because of the permanent physical characteristics of the line or because of the relatively shifting characteristics produced by such elements as automatic voltage regulators.

While I have shown a particular embodiment of my invention, it will, of course, be understood that I do not wish to be limited thereto since different modifications, both in the circuit arrangements and in the instrumentalities employed, may be made, and I contemplate by the appended claims to cover any such modifications as fall within the true spirit and scope of my invention.

What I claim as new and desire to secure by Letters Patent of the United States is:

1. In a multiple phase, multiple conductor power transmission system having unsymmetrical conductor capacitance distribution, ground fault neutralizer apparatus for protection against transient ground faults comprising a wye-connected grounding transformer and a ground fault neutralizer reactor, an auxiliary transformer connected at said apparatus for providing a voltage to match said apparatus to the unsymmetrical capacitances of said system, and voltage-changing devices for energizing said auxiliary transformer.

2. In a multiple phase, multiple conductor power transmission system having unsymmetrical conductor capacitance distribution, ground fault neutralizer apparatus for protection against transient ground faults comprising a wye-connected grounding transformer and a ground fault neutralizer reactor, an auxiliary transformer connected in series with said reactor for providing a voltage to match said apparatus to the unsymmetrical capacitances of said system, and manually adjustable voltage phase and magnitude-changing devices for energizing said auxiliary transformer.

3. In a multiple phase, multiple conductor power transmission system having unsymmetrical conductor capacitance distribution derived from the presence of voltage regulators in the system, ground fault neutralizer apparatus for protection against transient ground faults comprising a wye-connected grounding transformer and a ground fault neutralizer reactor, an auxiliary transformer connected in series with said reactor for providing a voltage to match said apparatus to the unsymmetrical capacitances of said system, and voltage phase and magnitude-changing devices for energizing said auxiliary transformer including transformers respectively connected at the input and output circuits of said voltage regulators.

4. In a multiple phase, multiple conductor power transmission system having unsymmetrical conductor capacitance distribution, ground fault neutralizer apparatus for protection against transient ground faults comprising a wye-connected grounding transformer and a ground fault neutralizer reactor, two voltage regulators connected at said grounding transformer for providing voltages to match said apparatus to the unsymmetrical capacitances of said system, said voltage regulators each including output voltage magnitude adjustments operable in response to conditions which determine the unsymmetrical conductor capacitance distribution.

NOEL E. DILLOW.

No references cited.